United States Patent [19]
Takeyasu et al.

[11] Patent Number: 6,043,291
[45] Date of Patent: Mar. 28, 2000

[54] METHOD FOR PRODUCING FOAMED SYNTHETIC RESIN

[75] Inventors: Hiromitsu Takeyasu; Minako Okamura; Nobuaki Tsukida; Hisashi Sato, all of Kawasaki, Japan

[73] Assignee: Asahi Glass Company Ltd., Tokyo, Japan

[21] Appl. No.: 09/089,355

[22] Filed: Jun. 3, 1998

[30]     Foreign Application Priority Data

Jun. 3, 1997 [JP] Japan ................................ 9-145497

[51] Int. Cl.[7] .................................................. C08G 18/00
[52] U.S. Cl. ........................................... 521/131; 521/155
[58] Field of Search ............................................ 521/131

[56]              References Cited

U.S. PATENT DOCUMENTS

| | | |
|---|---|---|
| 4,972,003 | 11/1990 | Grunbauer et al. . |
| 5,137,929 | 8/1992 | Demmin et al. ................... 521/131 |
| 5,426,127 | 6/1995 | Doerge . |
| 5,461,084 | 10/1995 | Doerge .................................... 521/131 |
| 5,496,866 | 3/1996 | Sommerfeld et al. . |
| 5,563,180 | 10/1996 | Skowronski et al. ................ 521/130 |
| 5,565,497 | 10/1996 | Godbey et al. ...................... 521/132 |

FOREIGN PATENT DOCUMENTS

| | | |
|---|---|---|
| 3-7738 | 5/1988 | Japan . |
| 2-235982 | 2/1989 | Japan . |
| 5-239251 | 9/1993 | Japan . |
| WO 95/08603 | 3/1995 | WIPO . |
| WO 97/11990 | 4/1997 | WIPO . |

*Primary Examiner*—Morton Foelak
*Attorney, Agent, or Firm*—Oblon, Spivak, McClelland, Maier & Neustadt, P.C.

[57]              ABSTRACT

A method for producing a foamed synthetic resin which comprises reacting a polyisocyanate compound with an active hydrogen compound having at least 2 active hydrogen-containing functional groups reactive with an isocyanate group in the presence of a foaming agent, wherein the foaming agent comprises at least two kinds of 1,1,1,3,3-pentafluoropropane and 1,1,1,2-tetrafluoroethane.

12 Claims, No Drawings

METHOD FOR PRODUCING FOAMED SYNTHETIC RESIN

The present invention relates to a method for producing a foamed synthetic resin such as polyurethane foam, more particularly a method for producing a foamed synthetic resin using a specific foaming agent.

It has been widely conducted to produce a foamed synthetic resin by reacting a polyisocyanate compound with an active hydrogen compound having at least 2 active hydrogen-containing functional groups reactive with an isocyanate group in the presence of a catalyst and a foaming agent.

Examples of the active hydrogen compound include a polyhydroxy compound, a polyamine compound and the like. Examples of the foamed synthetic resin thus obtained include polyurethane foam, polyisocyanurate foam, polyurea foam, and the like. Also, examples of a relatively low-foamed synthetic resin include a synthetic wood material and the like.

Various compounds are known as a foaming agent for producing the above foamed synthetic resins, but trichlorofluoromethane (hereinafter referred to as "CFC-11") has been mainly used. Also, water is usually used in combination with CFC-11. Further, when foaming is conducted by froth method, dichlorodifluoromethane (hereinafter referred to as "CFC-12") having a low boiling point (gas state at normal temperature under normal pressure) has been used in combination therewith.

CFC-11, CFC-12 or the like which has been widely used heretofore, is a chlorinated fluorocarbon (hereinafter "chlorinated fluorocarbon" is referred to as "CFC") quite stable in the atmosphere, and CFC reaches the ozonosphere above the atmosphere without being decomposed, where CFC is considered to be decomposed by the action of ultraviolet ray and the decomposed products are considered to destroy the ozonosphere.

The above mentioned CFC used as a foaming agent is partly leaked into the atmosphere, and its use is therefore considered to be one of causes to destroy the ozonosphere. Under these circumstances, a hydrogenated chlorinated fluorocarbon (hereinafter "hydrogenated chlorinated fluorocarbon" is referred to as "HCFC") such as 2,2-dichloro-1,1,1-trifluoroethane, 1,1-dichloro-1-fluoroethane or monochlorodifluoromethane, is considered to be less liable for destroying the ozonosphere since it has a hydrogen atom in its molecule and will be decomposed before reaching the ozonosphere above the atmosphere, and it has been therefore proposed to use HCFC as a foaming agent. However, these compounds also have an ozone-destroying coefficient, and do not present an essential solution to the problem. Therefore, in place of such CFC and HCFC, a foaming agent which is much less liable for destroying the ozonosphere and development of an improved technique of producing a foamed synthetic resin are demanded.

As a foaming agent in place of CFC or HCFC, it has been proposed to use a hydrogenated fluorocarbon ("hydrogenated fluorocarbon" is hereinafter referred to as "HFC").

JP-A-2-235982 discloses to use 1,1,1,3,3-pentafluoropropane as a foaming agent for producing a polyurethane foam. Further, JP-A-5-239251 discloses a method for producing a rigid polyurethane foam by using 1,1,1,3,3-pentafluoropropane and water.

However, in the cases of using 1,1,1,3,3-pentafluoropropane only as a foaming agent or using 1,1,1,3,3-pentafluoropropane and water only as a foaming agent, it has been difficult to produce a foamed synthetic resin having a uniform cell size. Further, in the initial stage of foaming reaction to form cells, there has been a possibility of destroying a part of cells by external factors before the formation of cells, and when the cells are destroyed, surface smoothness of the foamed synthetic resin thus obtained becomes poor and the outer surface appearance becomes also poor.

Still further, JP-A-3-7738 discloses to use 1,1,1,2-tetrafluoroethane as a foaming agent. However, in the case of using 1,1,1,2-tetrafluoroethane only as a foaming agent, froth voids are liable to be formed, thereby making the outer surface appearance unsatisfactory.

The present invention has been made in order to solve the above mentioned problems, and is to provide a method for producing a foamed synthetic resin which comprises reacting a polyisocyanate compound with an active hydrogen compound having at least 2 active hydrogen-containing functional groups reactive with an isocyanate group in the presence of a foaming agent, wherein the foaming agent comprises at least two kinds of 1,1,1,3,3-pentafluoropropane (hereinafter referred to as "HFC-245fa") and 1,1,1,2-tetrafluoroethane (hereinafter referred to as "HFC-134a").

The present invention is characterized by using HFC-245fa and HFC-134a in combination. By using these foaming agents in combination, the present invention can provide a satisfactory foamed synthetic resin having uniform cells.

When using HFC-245fa alone, it is difficult to obtain a foamed synthetic resin having a uniform cell size. Also, in the initial stage of foaming reaction to form cells, there is a possibility of destroying a part of cells by external factors before the formation of cells, and when the cells are destroyed, the surface smoothness of the foamed synthetic resin thus formed becomes poor, thereby making the outer surface appearance also poor. Further, when HFC-134a is used alone, froth voids are liable to be formed, thereby making the outer surface appearance unsatisfactory. At any cases, when a large product is formed, its thermal conductivity, outer surface appearance and size stability are unsatisfactory.

HFC-245fa and HFC-134a are used preferably in a weight ratio of 20-99/1-80, more preferably 40-99/1-60. Even when other compound is used as a third component of a foaming agent in combination therewith, the above two kinds of components are used preferably in the above mentioned weight ratio range.

In the present invention, it is possible to use HFC-245fa and HFC-134a only as a foaming agent, and it is also possible to use other foaming agent in combination therewith.

Water can be used as other foaming agent in combination therewith. Water is particularly preferable and is used in such an amount as described below.

When a foaming agent other than water is used in combination therewith, it is particularly preferable to use a low boiling point hydrocarbon.

The proportion of the low boiling point hydrocarbon is preferably at most 20 wt %, more preferably at most 10 wt %, most preferably at most 5 wt %, to the total amount of foaming agents except for water.

If the proportion of the low boiling point hydrocarbon exceeds 20 wt %, it is not preferable since the foaming agent components become highly flammable. By using a hydrocarbon, the apparent boiling point of a foaming agent composition is raised, and therefore even a system containing HFC-134a component in a relatively high proportion is improved in respect to operatability.

A $C_3$–$C_6$ hydrocarbon is preferable as the low boiling point hydrocarbon. Examples of the $C_3$–$C_6$ hydrocarbon include n-butane, isobutane, n-pentane, isopentane, neopentane, cyclopentane, n-hexane, isohexane, cyclohexane and the like. Particularly, cyclopentane is preferable. When at least one of $C_3$–$C_6$ hydrocarbons is used in combination with HFC-245fa and HFC-134a, at least one of $C_3$–$C_6$ hydrocarbons/HFC-245fa/HFC-134a are used preferably in a weight ratio of 1-20/15-80/1-75, more preferably 1-10/15-80/19-75, most preferably 1-5/40-80/19-50.

Examples of compounds other than water and hydrocarbons, which can be used as a foaming agent in combination with HFC-245fa and HFC-134a, include a low boiling point HFC other than HFC-245fa and HFC-134a, a low boiling point fluorocarbon, an inert gas and the like. The boiling point of the low boiling point HFC, the low boiling point fluorocarbon or the low boiling point hydrocarbon in the present invention is preferably lower than 100° C., more preferably at most 80° C.

The total proportion of fluorocarbon and HFC other than HFC-245fa and HFC-134a is preferably at most 50 wt %, more preferably at most 20 wt %, to the total foaming agents except for water. Further, the proportion of inert gas is preferably at most 10 wt % to the total foaming agents except for water.

Further the total proportion of HFC-245fa, HFC-134a and a $C_3$–$C_6$ hydrocarbon is preferably at least 50 wt %, more preferably at least 80 wt %, to the total foaming agents except for water. Most preferably, its proportion is substantially 100 wt %.

Examples of compounds of HFC and fluorocarbon usable in combination include:

$CH_2F_2$, $CF_2HCH_3$, $CF_3CF_2H$, $CF_3CH_3$, $CF_3CF_2CF_2H$, $CF_3CFHCF_3$, $CHF_2CF_2CHF_2$, $CF_3CF_2CFH_2$, $CF_3CHFCHF_2$, $CF_3CH_2CF_3$, $CF_2HCF_2CFH_2$, $CF_3CF_2CH_3$, $CF_2HCHFCF_2H$, $CF_3CHFCFH_2$, $CFH_2CF_2CFH_2$, $CF_2HCF_2CH_3$, $CF_2HCHFCFH_2$, $CF_3CHFCH_3$, $CF_2HCH_2CF_2H$, $CF_3CH_2CFH_2$, $CFH_2CF_2CH_3$, $CH_2FCHFCH_2F$, $CF_2HCHFCH_3$, $CH_2FCH_2CF_2H$, $CF_3CH_2CH_3$, $CH_3CF_2CH_3$, $CH_2FCHFCH_3$, $CH_2FCH_2CH_2F$, $CHF_2CH_2CH_3$, $CH_3CHFCH_3$, $CH_2FCH_2CH_3$, $CF_3CF_2CF_2CH_3$, $CF_3CH_2CH_2CF_3$, $CF_3CHFCF_2CH_3$, $CF_3CHFCHFCF_3$, $CF_3CF_2CF_2CH_2F$, $CF_3CHFCH_2CF_3$, $CH_3CF_2CF_2CHF_2$, $CF_3CF_2CHFCHF_2$, $CF_3CF_2CH_2CHF_2$, $CF_3CH_2CF_2CH_3$, $CF_3CHFCHFCH_3$, $CF_3CH$ ($CF_3$) $CH_3$, $CH_3CF(CF_3)CHF_2$, $CH_3CH$ ($CF_3$) $CH_2F$, $CH_3CH$ ($CF_3$) $CHF_2$, $CH_2FCF(CF_3)CH_2F$, $CH_3CF$ ($CHF_2$)$CHF_2$, $CF_4$, $C_2F_6$, $C_3F_8$, $C_4F_{10}$, $C_5F_{12}$, $C_6F_{14}$, $C_7F_{16}$, $C_5F_{10}$ (perfluorocyclopentane), $C_6F_{12}$ (perfluorocyclohexane) and $C_6F_6$ (perfluorobenzene).

Examples of an inert gas include air, nitrogen and the like.

Examples of an active hydrogen compound usable in the present invention include preferably a polyol widely used as a compound having at least 2 hydroxyl groups. Active hydrogen compounds such as a compound having at least 2 phenolic hydroxyl groups (e.g. initial condensate of phenolic resin), amines and the like can also be used. As an active hydrogen compound in the present invention, it is preferable to use such a polyol only as described below or to use a polyol in combination with a compound having a phenolic hydroxyl group, amines or the like.

Examples of the polyol include a polyether type polyol, a polyester type polyol, a polymer having a hydroxyl group introduced at the terminal and having the main chain of hydrocarbon type polymer (hereinafter referred to as "hydrocarbon type polymer having a hydroxyl group at the terminal"), a polyhydric alcohol and the like.

An active hydrogen compound to be used is preferably a polyol only, more preferably a polyether type polyol only or a mixture of a major proportion of polyether type polyol with a minor proportion of a polyester type polyol or a minor proportion of a hydrocarbon type polymer having a hydroxyl group at the terminal.

The polyether type polyol is preferably obtained by reacting a cyclic ether with a compound containing an active hydrogen reactive with the cyclic ether as an initiator in the presence of a catalyst.

Examples of the initiator include the following compounds or compounds having a small amount of cyclic ether adducted to these compounds. A mixture of at least two members of them may also be used as an initiator.

Polyhydric alcohols and saccharides such as ethylene glycol, propylene glycol, diethylene glycol, dipropylene glycol, tripropylene glycol, 1,2-butanediol, 1,4-butanediol, 2,2-dimethyl-1,3-propanediol, 1,6-hexanediol, 2-methyl-2,4-pentanediol, 3-methyl-1,5-pentanediol, 1,4-cyclohexanediol, 1,4-cyclohexanedimethanol, glycerin, trimethylolpropane, 1,2,6-hexanetriol, pentaerythritol, diglycerin, tetramethylolcyclohexane, methyl glucoside, sorbitol, manitol, dulcitol, sucrose and the like; polyhydric phenols such as bisphenol A, phenol-formaldehyde initial condensate and the like; alkanolamines such as monoethanolamine, diethanolamine, triethanolamine, isopropanolamine, N-(2-aminoethyl)ethanolamine and the like; and amines such as ethylenediamine, propylenediamine, hexamethylenediamine, piperazine, aniline, ammonia, N-aminomethylpiperazine, N-(2-aminoethyl)piperazine, 4-methyl-1,3-phenylenediamine, 2-methyl-1,3-phenylenediamine, 4,4'-diphenylmethanediamine, xylylenediamine, diethylenetriamine, triethylenetetramine and the like.

The cyclic ethers used in the present invention is a cyclic ether compound of 3 to 6-membered ring having one oxygen atom in the ring, examples of which are illustrated below.

Compounds having a 3-membered cyclic ether group such as ethylene oxide, propylene oxide, isobutylene oxide, 1-butylene oxide, 2-butylene oxide, trimethylethylene oxide, tetramethylethylene oxide, butadiene monooxide, styrene oxide, α-methylstyrene oxide, epichlorohydrin, epifluorohydrin, epibromohydrin, glycidol, butylglycidyl ether, hexylglycidyl ether, phenylglycidyl ether, 2-chloroethylglycidyl ether, o-chlorophenylglycidyl ether, ethylene glycol diglycidyl ether, bisphenol A diglycidyl ether, cyclohexene oxide, dihydronaphthalene oxide, 3,4-epoxy-1-vinylcyclohexane and the like, compounds having 4 to 6-membered cyclic ether groups such as oxetane, tetrahydrofuran, tetrahydropyran and the like, and so on.

Preferable examples of a cyclic ether compound include a compound having one 3-membered cyclic ether group (monoepoxide), and more preferable examples of a cyclic ether compound include a $C_2$–$C_4$ alkylene oxide such as ethylene oxide, propylene oxide, isobutylene oxide, 1-butene oxide, 2-butene oxide and the like. A most preferable cyclic ether compound is propylene oxide or a combination of propylene oxide with ethylene oxide.

Cyclic ether compounds may be used in a mixture of two or more, and in such a case, they may be mixed and reacted or they may be reacted in regular succession.

Examples of a polyester polyol include a polyester polyol obtained by polycondensation of a polyhydric alcohol and a polyhydric carboxylic acid. Other examples include polyester polyols obtained by polycondensation of hydroxycarboxylic acid, polymerization of cyclic ester (lactone), polyaddition of cyclic ether to polycarboxylic acid anhydride or transesterification of waste polyethylene terephthalate.

Examples of a hydrocarbon type polymer having a hydroxyl group at the terminal include hydrogenated polybutadiene polyol, polybutadiene polyol and the like.

Examples of polyhydric alcohols include polyhydric alcohols and saccharides such as ethylene glycol, propylene glycol, diethylene glycol, dipropylene glycol, tripropylene glycol, 1,2-butanediol, 1,4-butanediol, 2,2-dimethyl-1,3-propanediol, 1,6-hexanediol, 2-methyl-2,4-pentanediol, 3-methyl-1,5-pentanediol, 1,4-cyclohexanediol, 1,4-cyclohexanedimethanol, glycerin, trimethylolpropane, 1,2,6-hexanetriol, pentaerythritol, diglycerin, tetramethylolcyclohexane, methyl glucoside, sorbitol, manitol, dulcitol, sucrose and the like.

As a polyol, a polyol composition having vinyl polymer fine particles dispersed in a polyether type polyol mainly, called as a polymer polyol or a graft polyol, can also be used.

When a rigid polyurethane foam is produced as a foamed synthetic resin, a hydroxyl value of the polyol is preferably from 200 to 1000 mgKOH/g, more preferably from 350 to 600 mgKOH/g. The polyol may be a mixture, and in such a case, their hydroxyl values are averagely from 200 to 1000 mgKOH/g, particularly from 350 to 600 mgKOH/g.

When a soft polyurethane foam or a semi-rigid polyurethane foam is produced as a foamed synthetic resin, a hydroxyl value of the polyol is preferably from 20 to 200 mgKOH/g, more preferably from 20 to 100 mgKOH/g. The polyol may be a mixture, and in such a case, their hydroxyl values are averagely from 20 to 200 mgKOH/g, particularly from 20 to 100 mgKOH/g.

Examples of a compound having at least 2 phenolic hydroxyl groups usable as an active hydrogen compound other than the above mentioned polyols, include phenols such as bisphenol A, resol type initial condensates obtained by condensing the above phenols with an excess amount of formaldehydes in the presence of an alkali catalyst, benzylic type initial condensates obtained by conducting the reaction of synthesizing the above resol type initial condensates in a non-aqueous system, novolak type initial condensates obtained by reacting an excess amount of phenols with formaldehydes in the presence of an acid catalyst, and the like. These initial condensates have a molecular weight of preferably from 200 to 10000.

The above mentioned phenols mean a compound having at least one carbon atom in the benzene ring directly bonded with a hydroxyl group, and also include a compound having other substituents in the same structure. Typical examples include phenol, cresol, bisphenol A, resorcinol, and the like. Examples of the formaldehydes are not specially limited, but preferably include formalin, paraformaldehyde and the like.

Examples of amines usable as an active hydrogen compound other than the above mentioned polyols include alkanol amines such as monoethanolamine, diethanolamine, triethanolamine, isopropanolamine, N-(2-aminoethyl)ethanolamine and the like; polyhydric amines such as ethylenediamine, propylenediamine, hexamethylenediamine, piperazine, N-aminomethylpiperazine, N-(2-aminoethyl)piperazine, 4-methyl-1,3-phenylenediamine, 2-methyl-1,3-phenylenediamine, 4,4'-diphenylmethanediamine, xylylenediamine, diethylenetriamine, triethylenetetramine, and the like; and so on.

Examples of a polyisocyanate compound include an aromatic, cycloaliphatic or aliphatic polyisocyanate having averagely at least 2 isocyanate groups, a mixture of two or more of these polyisocyanates, and a modified polyisocyanate obtained by modifying these polyisocyanates. Particular examples include polyisocyanates such as 2,4-tolylene diisocyanate, 1,6-tolylene diisocyanate, 4,4'-diphenylmethane diisocyanate, polymethylenepolyphenyl isocyanate (common name: crude MDI), xylylene diisocyanate, isophorone diisocyanate, hexamethylene diisocyanate and the like, or their prepolymer type modified products, isocyanurate-modified products, urea-modified products, carbodiimide-modified products, and the like.

When reacting an active hydrogen compound with a polyisocyanate compound, it is usually necessary to use a catalyst. Examples of the catalyst which promotes the reaction of an active hydrogen-containing group and an isocyanate group, include a metal compound type catalyst such as an organic tin compound and a tertiary amine catalyst such as triethylenediamine. Further, a polymerization catalyst to cause a reaction among isocyanate groups, such as a carboxylic acid metal salt, can also be used depending on an object.

Still further, a foam stabilizer for forming satisfactory foams is often used in many cases. Examples of the foam stabilizer include a silicone type foam stabilizer, a fluorine-containing compound type foam stabilizer and the like. Examples of other components which can be optionally used include a filler, a stabilizer, a coloring agent, a flame-retardant, and the like.

A foamed synthetic resin is obtained by using these starting materials. Examples of the foamed synthetic resin include polyurethane foam, urethane-modified polyisocyanurate foam, polyurea foam, micro-cellular polyurethane elastomer, micro-cellular polyurethaneurea elastomer, micro-cellular polyurea elastomer, and the like. The polyurethane foam is classified into a rigid polyurethane foam, a soft polyurethane foam and a semi-rigid polyurethane foam.

The foamed synthetic resin of the invention can be produced by one shot method, spray method, prepolymer method, quasi-prepolymer method or RIM method.

When producing a rigid polyurethane foam, an urethane-modified polyisocyanurate foam or other rigid foamed synthetic resins as a foamed synthetic resin, the total amount of HFC-245fa and HFC-134a used as foaming agents in the present invention is preferably from 5 to 150 wt %, more preferably from 20 to 60 wt %, to the amount of an active hydrogen compound.

When a $C_3$–$C_6$ hydrocarbon is used, it is used in such an amount as to make the total amount of a $C_3$–$C_6$ hydrocarbon, HFC-245fa and HFC-134a preferably from 5 to 180 wt %, more preferably from 20 to 70 wt %, to the amount of an active hydrogen compound.

Further, in combination therewith, it is preferable to employ water in an amount of from 0 to 10 wt %, preferably from 0.01 to 10 wt %, more preferably from 0.1 to 10 wt %, most preferably from 1 to 5 wt %, to the amount of an active hydrogen compound (water is not included in the active hydrogen compound).

On the other hand, when producing a soft polyurethane foam, a semi-rigid polyurethane foam or a soft foamed synthetic resin such as a synthetic wood material as a foamed synthetic resin, the specific foaming agents of the present invention, i.e. HFC-245fa and HFC-134a, are used in the total amount of preferably from 5 to 150 wt %, more preferably from 20 to 60 wt %, to the amount of an active hydrogen compound. When a $C_3$–$C_6$ hydrocarbon is used, it is used in such an amount as to make the total amount of a $C_3$–$C_6$ hydrocarbon, HFC-245fa and HFC-134a preferably from 5 to 180 wt %, more preferably from 20 to 70 wt %.

When producing a soft polyurethane foam or a semi-rigid polyurethane foam, it is preferable to use water in an amount of from 0 to 10 wt %, preferably from 0.01 to 10 wt %, more preferably from 1 to 10 wt %, to the amount of an active hydrogen compound (water is not included in the active hydrogen compound). When producing a synthetic wood, it is preferable to use water in an amount of from 0 to 5 wt %, preferably from 0.01 to 5 wt %, more preferably from 1 to 5 wt %, to the amount of an active hydrogen compound (water is not included in the active hydrogen compound).

The present invention is useful in the production of a rigid foamed synthetic resin which requires a large amount of a halogenated hydrocarbon type foaming agent, and is useful in the production of a rigid polyurethane foam and a urethane-modified polyisocyanurate foam, and other rigid foamed synthetic resins. Further, the present invention is particularly suitable for producing a rigid polyurethane foam. Still further, the present invention is particularly suitable for producing a rigid polyurethane foam using a polyol having a hydroxyl value of from 200 to 1000 mgKOH/g as an active hydrogen compound.

EXAMPLES

The present invention is further illustrated by the following Examples, but should not be limited to these Examples.

The following polyols a to d were used in such weight ratios (E to G) as shown in the following Table 1. Mixtures of HFC-245fa, HFC-134a and cyclopentane in such weight ratios (H to N) as shown in the following Table 2 were used as foaming agents.

Polyol a: polyether polyol having a hydroxyl value of 420 obtained by reacting glycerin and propylene oxide;

Polyol b: polyether polyol having a hydroxyl group of 450 and having an oxyethylene group content of 10 wt %, obtained by reacting sucrose and propylene oxide and further reacting ethylene oxide therewith;

Polyol c: polyether polyol having a hydroxyl value of 440 obtained by reacting ethylenediamine and propylene oxide; and Polyol d: polyether polyol having a hydroxyl value of 450 and having an oxyethylene group content of 15 wt %, obtained by reacting 4-methyl-1,3-phenylenediamine and propylene oxide and further reacting ethylene oxide therewith.

TABLE 1

|   | a | b | c | d |
|---|---|---|---|---|
| E | 20 | 40 | 0 | 40 |
| F | 0 | 50 | 50 | 0 |
| G | 0 | 0 | 100 | 0 |

TABLE 2

|   | HFC-245fa | HFC-134a | Cyclopentane |
|---|---|---|---|
| H | 80 | 20 |   |
| I | 70 | 30 |   |
| J | 60 | 40 |   |
| K | 0 | 100 |   |
| L | 100 | 0 |   |
| M | 50 | 30 | 20 |
| N | 10 | 40 | 50 |

Foaming evaluation was carried out in the following manner. A polyol mixture was obtained by mixing 100 parts by weight of each polyol mixed at the above ratios E to G, 2 parts by weight of water, each foaming agent of such a kind in such an amount (part by weight) as shown in the following Tables 3 to 4, 2 parts by weight of a silicone type foam stabilizer, and a N,N-dimethylcyclohexylamine catalyst in such an amount as to make a gelling time of 45 seconds. The polyol mixture thus prepared was mixed with polymethylenepolyphenylisocyanate at a liquid temperature of 20° C. so as to provide an index of 110, and the resultant mixture was placed in a wooden box of 200 mm×200 mm×200 mm to foam and obtain a rigid polyurethane foam. The amount of each foaming agent was controlled so as to provide a core density of 30±2 kg/m³ in the foamed synthetic resin.

The rigid polyurethane foams thus obtained were evaluated in the following manner.

Compatibility of each foaming agent to each polyol mixture and outer appearance of each foam were evaluated by marks, ○: good, Δ: fair (somewhat good), and X: no good (bad).

Size stability was evaluated by measuring a size change in the thickness direction of the core part of each foam before and after allowing to stand at −30° C. for 24 hours. When the size change ratio was less than 3%, it was evaluated as ○ (good and no problem for use); when the size change ratio was from 3 to 5%, it was evaluated as Δ (fair and almost no problem for use); and when the size change ratio exceeded 5%, it was evaluated as X (no good and substantial problem raised for use).

Thermal conductivity was evaluated as ○ (good and no problem for use) when the thermal conductivity value is less than 0.0150 kcal/mhr ° C.; and thermal conductivity was evaluated as Δ (fair and almost no problem for use) when the thermal conductivity value was from 0.0150 to 0.0165 kcal/mhr ° C.

The results are shown in the following Tables.

TABLE 3

| Examples | 1 | 2 | 3 | 4 | 5 | 6 | 7 | 8 | 9 | 10 |
|---|---|---|---|---|---|---|---|---|---|---|
| Polyol | E | F | G | E | F | G | E | F | G | E |
| Foaming agent | H | H | H | I | I | I | J | J | J | M |
| Amount used | 30 | 30 | 30 | 30 | 30 | 30 | 30 | 30 | 30 | 30 |
| Compatibility | ○ | ○ | ○ | ○ | ○ | ○ | ○ | ○ | ○ | ○ |
| Foam performances |   |   |   |   |   |   |   |   |   |   |
| Appearance | ○ | ○ | ○ | ○ | ○ | ○ | ○ | ○ | ○ | ○ |
| Size stability | ○ | ○ | ○ | ○ | ○ | ○ | ○ | ○ | ○ | ○ |
| Thermal conductivity | ○ | ○ | ○ | ○ | ○ | ○ | ○ | ○ | ○ | ○ |

TABLE 4

| Comparative Examples | 11 | 12 | 13 | 14 | 15 | 16 | 17 |
|---|---|---|---|---|---|---|---|
| Polyol | E | F | G | E | F | G | E |
| Foaming agent | K | K | K | L | L | L | N |
| Amount used | 30 | 30 | 30 | 30 | 30 | 30 | 20 |
| Compatibility | X | Δ | ○ | 603 | 603 |   |   |
| Foam performances |   |   |   |   |   |   |   |
| Appearance | X | X | X | X | Δ | Δ | Δ |
| Size stability | Δ | Δ | Δ | X | X | X | Δ |
| Thermal conductivity | Δ | Δ | Δ | ○ | ○ | ○ | ○ |

The present invention achieves an effect of producing a satisfactory foamed synthetic resin without substantially using CFC or HCFC which may destroy the ozone layer.

What is claimed is:

1. A method for producing a foamed synthetic resin which comprises reacting a polyisocyanate compound with an active hydrogen compound having at least 2 active hydrogen-containing functional groups reactive with an isocyanate group in the presence of a foaming agent, wherein the foaming agent comprises at least 1,1,1,3,3-pentafluoropropane and 1,1,1,2-tetrafluoroethane.

2. The method according to claim 1, wherein 1,1,1,3,3-pentafluoropropane and 1,1,1,2-tetrafluoroethane are used in a weight ratio of 20-99/1-80.

3. The method according to claim 1, wherein water is used in combination with 1,1,1,3,3-pentafluoropropane and 1,1,1,2-tetrafluoroethane as a foaming agent.

4. The method according to claim 3, wherein water is used in an amount of from 0.01 to 10 wt % to an active hydrogen compound other than water.

5. The method according to claim 1, wherein a rigid polyurethane foam is produced as the foamed synthetic resin.

6. The method according to claim 5, wherein a polyol having a hydroxyl value of from 200 to 1000 mgKOH/g is used as the active hydrogen compound having at least 2 active hydrogen-containing functional groups reactive with an isocyanate group.

7. A method for producing a foamed synthetic resin which comprises reacting a polyisocyanate compound with an active hydrogen compound having at least 2 active hydrogen-containing functional groups reactive with an isocyanate group in the presence of a foaming agent, wherein the foaming agent comprises at least (1) 1,1,1,3,3-pentafluoropropane, (2) 1,1,1,2-tetafluoroethane and (3) at least one of a $C_3$–$C_6$ hydrocarbon, and the $C_3$–$C_6$ hydrocarbon is used in an amount of at most 20 wt % to a total amount of (1), (2) and (3).

8. The method according to claim 7, wherein a weight ratio of at least one of a $C_3$–$C_6$ hydrocarbon/1,1,1,3,3-pentafluoropropane/1,1,1,2-tetrafluoroethane is 1-20/15-80/1-75.

9. The method according to claim 7, wherein water is used in combination with a $C_3$–$C_6$ hydrocarbon, 1,1,1,3,3-pentafluoropropane and 1,1,1,2-tetrafluoroethane as a foaming agent.

10. The method according to claim 9, wherein water is used in an amount of from 0.01 to 10 wt % to an active hydrogen compound other than water.

11. The method according to claim 7, wherein a rigid polyurethane foam is produced as the foamed synthetic resin.

12. The method according to claim 10, wherein a polyol having a hydroxyl value of from 200 to 1000 mgKOH/g is used as the active hydrogen compound having at least 2 active hydrogen-containing functional groups reactive with an isocyanate group.

* * * * *